United States Patent Office 3,522,273
Patented July 28, 1970

3,522,273
2-(ETHYLAMINO)-2-(2-THIENYL)CYCLOHEXA-
NONE AND ACID ADDITION SALTS
Robert F. Parcell, Ann Arbor, Mich., assignor to Parke
Davis & Company, Detroit, Mich., a corporation of
Michigan
No Drawing. Continuation-in-part of application Ser. No.
441,368, Mar. 19, 1965. This application Jan. 26, 1968,
Ser. No. 700,756
Int. Cl. A61k 27/00; C07d 63/12
U.S. Cl. 260—332.3      4 Claims

ABSTRACT OF THE DISCLOSURE 2-(ethylamino)-2-(2-thienyl)-cyclohexanone and acid-addition salts. The compounds have pharmacological activity and can be produced by (a) heating 1-hydroxy-cyclopentyl 2-thienyl N-ethylketimine to produce a thermal rearrangement, or (b) reacting 2-amino-2-(2-thienyl) cyclohexanone with an ethylating agent.

CROSS REFERENCE TO RELATED APPLICATION

This is a continuation-in-part of my co-pending application Ser. No. 441,368, filed Mar. 19, 1965, now abandoned.

SUMMARY AND DETAILED DESCRIPTION

The present invention relates to new thiophene compounds. More particularly, the invention relates to 2-(ethylamino)-2-(2-thienyl)cyclohexanone of the formula

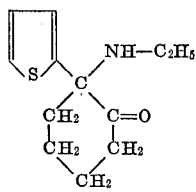

to acid-addition salts thereof and to methods for the production of the foregoing compounds.

In accordance with the invention, the foregoing compounds can be produced by heating 1-hydroxycyclopentyl 2-thienyl N-ethylketimine of the formula

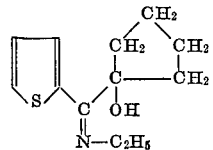

or an acid-addition salt thereof. This process is a thermal rearrangement reaction. It can be carried out, if desired, in the absence of a solvent, but it is preferable to employ a solvent. Some examples of satisfactory solvents are high boiling hydrocarbons such as hexacosane and biphenyl; high boiling ethers such as diphenyl ether and pentyl phenyl ether; high boiling neutral petroleum fractions; mineral oils, and mixtures thereof. A preferred solvent is the eutectic mixture containing 73.5% of diphenyl ether and 26.5% of biphenyl. The process is carried out by heating at a temperature of about 175–275° C. or optionally somewhat higher, for 1 to 15 minutes. It is preferred to use the starting material in the form of its free base and to heat in a solvent at 250° C. for about 5 minutes. The product is isolated either as the free base or as an acid-addition salt by adjustment of the pH as required.

1-hydroxycyclopentyl 2-thienyl N-ethylketimine and acid-addition salts thereof employed as starting materials in the foregoing process can be prepared by a variety of methods. For example, cyclopentyl 2-thienyl ketone is monobrominated and the resulting 1-bromocyclopentyl 2-thienyl ketone is reacted with ethylamine to give 1-hydroxycyclopentyl 2-thienyl N-ethylketimine. Alternatively, 2-thienylmagnesium bromide or 2-thienyl-lithium is reacted under anhydrous conditions with the tetrahydro-2-pryanyl ether of cyclopentanone cyanohydrin and the product treated with water to give the tetrahydro-2-pyranyl ether of 1-hydroxycyclopentyl 2-thienyl ketimine. The tetrahydro-2-pyranyl ether of 1-hydroxycyclopentyl 2-thienyl ketimine is hydrolyzed by heating with aqueous mineral acid to give 1-hydroxycyclopentyl 2-thienyl ketone. The latter compound is converted to 1-hydroxycyclopentyl 2-thienyl N-ethylketimine by reaction with ethylamine. These procedures are illustrated in greater detail below.

Also in accordance with the invention, 2-(ethylamino)-2-(2-thienyl)cyclohexanone and acid-addition salts thereof can be produced by reacting 2-amino-2-(2-thienyl)-cyclohexanone having in free base form the formula

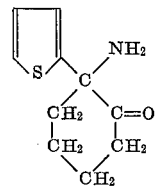

with an ethylating agent. Some examples of suitable ethylating agent are esters of ethanol, such as ethyl halides and diethyl sulfate. The reaction is normally carried out in the presence of a base such as an alkali metal carbonate or bicarbonate, an alkaline earth metal carbonate, oxide or hydroxide, or an organic tertiary amine. At least approximately one equivalent and preferably up to a moderate excess of the ethylating agent is used. Some suitable solvents for the reaction are lower aliphatic ketones such as acetone, methyl ethyl ketone, and diethyl ketone; lower alkanols such as methanol, ethanol, and isopropyl alcohol; and other relatively unreactive solvents such as tetrahydrofuran, dioxane, acetonitrile, and dimethylformamide. The time and temperature required for the reaction vary somewhat with the ethylating agent and solvent used, but in general the reaction is substantially complete when carried out at a temperature of from 15 to 100° C. for from 1 to 96 hours, the longer reaction times being used with the lower temperatures. With acetone as solvent it is customary to conduct the reaction at the reflux temperature for from 12 to 18 hours. The reaction product is isolated directly as the free base, or following acidification, as an acid-addition salt.

The 2-amino-2-(2-thienyl)cyclohexanone employed as starting material in the foregoing process can be prepared by a variety of methods. For example, cyclopentyl 2-thienyl ketone is monobrominated and the resulting 1-bromocyclopentyl 2-thienyl ketone is reacted with ammonia to give 1-hyroxycyclopentyl 2-thienyl ketimine. The latter compound is converted by thermal rearrangement to 2-amino-2-(2-thienyl)cyclohexanone. The 1-hydroxycyclopentyl 2-thienyl ketimine can also be obtained by reacting the tetrahydro-2-pyranyl ether of 1-hydroxycyclopentyl 2-thienyl ketimine with anhydrous hydrogen chloride followed by basification.

2-(ethylamino)-2-(2-thienyl)cyclohexanone of the invention forms acid-addition salts with a variety of inorganic and organic acids. Pharmaceutically-acceptable acid-addition salts are formed by reaction with such acids as hydrochloric, hydrobromic, sulfuric, phosphoric, acetic, succinic, citric, maleic, and pamoic acids. The acid-addition salts are converted to the free base by reaction with a base such as sodium hydroxide, potassium carbonate, or potassium bicarbonate. The free base and its acid-addition salts differ in solubility properties but in general are otherwise equivalent for the purposes of the invention.

The compounds of the invention are valuable as pharmacological agents. They produce a depressant effect on the central nervous system. They are cataleptic and anesthetic agents capable of producing catalepsy and general anesthesia and in addition are anticonvulsant agents. Their activity as anticonvulsant agent can be measured by determining their ability to prevent the occurrence of convlusions following electroshock, according to the standard methods of Toman, Swinyard, and Goodman, Journal of Neurophysiology, 9, 231 (1946), in rats or mice; or Putnam and Merritt, Science, 85, 525 (1937), in cats. In mice, using an electric current of 24 milliamperes applied for 0.2 second through clips on the ears, the intraperitoneal dose of 2-(ethylamino) - 2 - (2 - thienyl) cyclohexanone hydrochloride protecting 50% of the animals against convulsions ($PD_{50}$) was determined as greater than 6 and less than 12.5 mg./kg. Greater and lesser degrees of protection are observed at higher and lower doses.

The catalpetic and anesthetic activities of the compounds of the invention can be measured according to the same procedures used for phencyclidine, also known as 1-(1-phenylcyclohexyl)piperidine hydrochloride, a cyclohexylamine-type central nervous system depressant whose activity has been evaluated in many species. In mice, the activity of 2-(ethylamino)-2-(2-thienyl)cyclohexanone hydrochloride was evaluated on the basis of its ability to cause a loss of righting reflex, characteristic of cataleptic and/or anesthetic activity. The intraperitoneal dose capable of p roducing the loss of righting reflex in 50% of the animals ($ED_{50}$) was determined as $25.0 \pm 1.6$ mg./kg. The intraperitoneal means lethal dose ($LD_{50}$) in mice is several times as large. In monkeys, the activity of 2-(ethylamino)-2-(2-thienyl)cyclohexanone hydrochoride as a general anesthetic agent was determined by intravenous administration. The minimum anesthetic dose was determined to be 0.73 mg./kg. The minimum anesthetic dose is a value obtained by plotting the logarithms of a series of doses against the durations of effect and extrapolating the curve to zero minutes. The compounds of the invention exhibit comparatively high anesthetic potency with a relatively short duration of action. They do not exhibit indirect sympathomimetic properties to a significant degree, as shown by the fact that in dogs they have little or no influence on the hypertensive effects of norepinephrine, 4-(m - chlorophenylcarbomoyloxy) - 2- butynyltrimethylammonium chloride (McN–A–343), or dimethylphenylpiperazinium iodide (DMPP); for test procedure see Chen, Ensor and Bohner; Journal of Pharmacology & Experimental Therapeutics, 149, 71–78 (1965). By intravenous administration over a dosage range from 1.0 to 8.0 mg./kg., 2-(ethylamino)-2-(2-thienyl)cyclohexanone hydrochloride was found to have little or no influence on the hypertensive effects of norepinephrine, McN–A–343, or DMPP.

The compounds of the invention are active on both oral and parenteral administration.

The invention is illustrated by the following examples.

Example 1

A solution of 20 g. of 1-hydroxycyclopentyl 2-thienyl N-ethylketimine in 200 ml. of a mixture of 73.5% diphenyl ether and 26.5% biphenyl is heated at 250° C. for 5 minutes. The mixture is coded to room temperature and stirred with 200 ml. of ether and 200 ml. of 0.5 N hydrochloric acid. The aqueous phase is separated, made basic with 20% aqueous sodium hydroxide and extracted with ether. The ether extract is dried, filtered and evaproated to give a residue of 2-(ethylamino)-2-(2-thienyl)-cyclohexanone. The hydrochloride is obtained by dissolving the free base in ether and treating the solution with dry hydrogen chloride until precipitation of the product is complete; following crystallization from isopropyl alcohol-ether the hydrochloride has M.P. 196–197° C. The hydrobromide and sulfate are obtained by treating the free base with dry hydrogen bromide or with sulfuric acid. A salt with citric acid is obtained by mixing methanolic solutions of the free base and citric acid and concentrating the mixture.

Example 2

A mixture of 25 g. of 2-amino-2-(2-thienyl)cyclohexanone, 21 g. of ethyl iodide, 42 g. of potassium carbonate, and 150 ml. of acetone is stirred and heated at reflux for 14 hours. The mixture is cooled, diluted with an equal volume of ether and filtered. The filtrate is evaporated to give a residue of 2-(ethylamino)-2-(2-thienyl)cyclohexanone. The hydrochloride is obtained by dissolving the free base in ether and adding a slight excess of dry hydrogen chloride. The hydrochloride has M.P. 196–197° C. following crystallization from isopropyl alcohol-ether. The hydrobromide is obtained by reacting the free base with dry hydrogen bromide. A salt with citric acid is obtained by mixing methanolic solutions of the free base and citric acid and concentrating the mixture.

STARTING MATERIALS

A solution of 48.8 g. of the tetrahydro-2-pyranyl ether of cyclopentanone cyanohydrin in 200 ml. of ether is added to a solution of 2-thienylmagnesium bromide prepared from 52.1 g. of 2-bromothiophene and 7.8 g. of magnesium in 250 ml. of ether. The mixture is heated at reflux for 16 hours, then chilled, and hydrolyzed by stirring with 200 ml. of 1:1 hydrochloric acid-water. The aqueous phase is separated, heated at 90–100° C. for 3 hours, cooled, and extracted with ether. The ether extract is dried and evaporated to give a residue of 1-hydroxycyclopentyl 2-thienyl ketone as an oil; B.P. 116–118° C. at 0.25 mm.

A solution of 2-thienyllithium is prepared by adding 126 g. of thiophene to a solution of 90 g. of butyllithium in 440 ml. of heptane and 700 ml. of ether and stirring the mixture for 15 minutes. There is then added dropwise 195 g. of the tetrahydro-2-pyranyl ether of cyclopentanone cyanohydrin and the mixture is stirred for 3 hours. The mixture is then stirred with 350 ml. of water and the organic phase separated, dried, and evaporated to give a residue of the tetrahydro-2-pyranyl ether of 1-hydroxycyclopentyl 2-thienyl ketimine; B.P. 137–142° C. at 0.1 mm.

An excess of hydrogen chloride is passed into a solution of 195 g. of the tetrahydro-2-pyranyl ether of 1-hydroxycyclopentyl 2-thienyl ketimine in 400 ml. of isopropyl alcohol. The solution is diluted with ether until precipitation of the product, 1-hydroxycyclopentyl 2-thienyl ketimine hydrochloride, is complete. This product, M.P. 163–167° C., is collected and dissolved in methanol containing one equivalent of sodium methoxide. The resulting mixture is treated with charcoal and filtered and the filtrate is evaporated to dryness at reduced pressure. The residue is dissolved in ether and the ether solution is washed with dilute aqueous sodium hydroxide, then with water, dried, and evaporated to give a residue of 1-hydroxycyclopentyl 2-thienyl ketimine.

A solution of 116.8 g. of bromine in 200 ml. of carbon tetrachloride is added to a solution of 131.5 g. of cyclopentyl 2-thienyl ketone in 600 ml. of carbon tetrachloride. The resulting solution is evaporated under reduced pressure at a temperature lower than 45° C. to give a residue of 1-bromocyclopentyl 2-thienyl ketone as an oil. This product can be used in the following preparation without purification.

With stirring, 100 g. of 1-bromocyclopentyl 2-thienyl ketone is added dropwise to 400 ml. of liquid ethylamine maintained below −57° C. The mixture is held at −65° C. for 10 minutes after the addition is complete and then allowed to warm to −5° C. over a 1 hour period. As the ethylamine evaporates, pentane is added to keep the volume of the mixture approximately constant. A precipitate of ethylamine hydrobromide is removed by filtration and the filtrate evaporated to dryness at reduced pressure to give a residue of 1-hydroxycyclopentyl 2-thienyl N-ethylketimine as an oil having infrared absorption maxima at 1640 and 1656 reciprocal centimeters.

A solution of 18 g. of 1-hydroxycyclopentyl 2-thienyl ketimine in 200 ml. of a mixture of 73.5% diphenyl ether and 26.5% biphenyl is heated at 250° C. for 5 minutes. The mixture is cooled to room temperature and stirred with 200 ml. of ether and 200 ml. of 0.5 N hydrochloric acid. The aqueous phase is separated, made basic with 20% aqueous sodium hydroxide and extracted with ether. The ether extract is dried, filtered, and evaporated to give a residue of 2-amino-2(2-thienyl)cyclohexanone; B.P. 116–118° C. at 0.4 mm. The hydrochloride has M.P. 218–219° C.

I claim:
1. A member of the class consisting of 2-(ethylamino)-2-(2-thienyl)cyclohexanone and pharmaceutically-acceptable acid-addition salts thereof.
2. A compound according to claim 1 which is 2-(ethylamino)-2-(2-thienyl)cyclohexanone.
3. A compound according to claim 1 which is a pharmaceutically-acceptable acid-addition salt of 2-(ethylamino)-2-(2-thienyl)cyclohexanone.
4. A compound according to claim 1 which is 2-(ethylamino)-2-(2-thienyl)cyclohexanone hydrochloride.

References Cited

UNITED STATES PATENTS 3,254,124  5/1966  Stevens _____ 260—570.5

OTHER REFERENCES

Migridician: Organic Synthesis (1957), p. 465.
Fieser, et al.: Advanced Organic Chemistry (1961), p. 493.
Stevens: J.A.C.S. (1963), 85:1464–70
Stevens: C.A. (1964), 61:5569–70.
Gordon: Psychopharmacological Agents (Academic Press, N.Y., 1964), p. 315.
Burger: Medicinal Chemistry (Interscience Pub., N.Y., 1960), p. 380–1.
Miller et al.: Proc. Soc. Exp. Bio. & Med. (1944), 57:261–4.

JOHN D. RANDOLPH, Primary Examiner

C. M. SHURKO, Assistant Examiner

U.S. Cl. X.R.

260—332.2; 424—275